United States Patent

[11] 3,629,890

| [72] | Inventor | Harold D. Harris<br>Lubbock, Tex. |
|---|---|---|
| [21] | Appl. No. | 822,280 |
| [22] | Filed | May 6, 1969 |
| [45] | Patented | Dec. 28, 1971 |
| [73] | Assignee | Harris and Thrush Manufacturing Company<br>Lubbock, Tex.<br>Continuation-in-part of application Ser. No. 709,981, Mar. 4, 1968, now Patent No. 3,460,698, dated Aug. 12, 1969. This application May 6, 1969, Ser. No. 822,280<br>The portion of the term of the patent subsequent to Aug. 12, 1986, has been disclaimed. |

[54] BEET CART
10 Claims, 5 Drawing Figs.

[52] U.S. Cl. .................................................. 15/3.11,
209/107, 214/519
[51] Int. Cl. ...................................................... A23n 15/00
[50] Field of Search .......................................... 15/3.11,
3.2; 209/106, 107, 101; 171/113; 214/83.32, 519, 522

[56] References Cited
UNITED STATES PATENTS

| 3,329,263 | 7/1967 | Rush et al. ..................... | 209/107 X |
| 3,399,766 | 9/1968 | Rollins .......................... | 209/107 |
| 3,460,698 | 8/1969 | Harris ........................... | 214/519 |
| 2,822,947 | 2/1958 | Van Wyhe .................... | 214/522 |

FOREIGN PATENTS

| 125,961 | 7/1959 | U.S.S.R. ........................ | 209/106 |

Primary Examiner—Edward L. Roberts
Attorney—Charles W. Coffee

ABSTRACT: A cart receives sugar beets from a harvester while the harvester is in operation. The cart then delivers the beets for transportation to a refinery. The beets are delivered from the cart by an elevator and are cleaned in the cart as they are moved to and up the elevator.

INVENTOR:
HAROLD D. HARRIS

PATENTED DEC28 1971 3,629,890
SHEET 2 OF 3
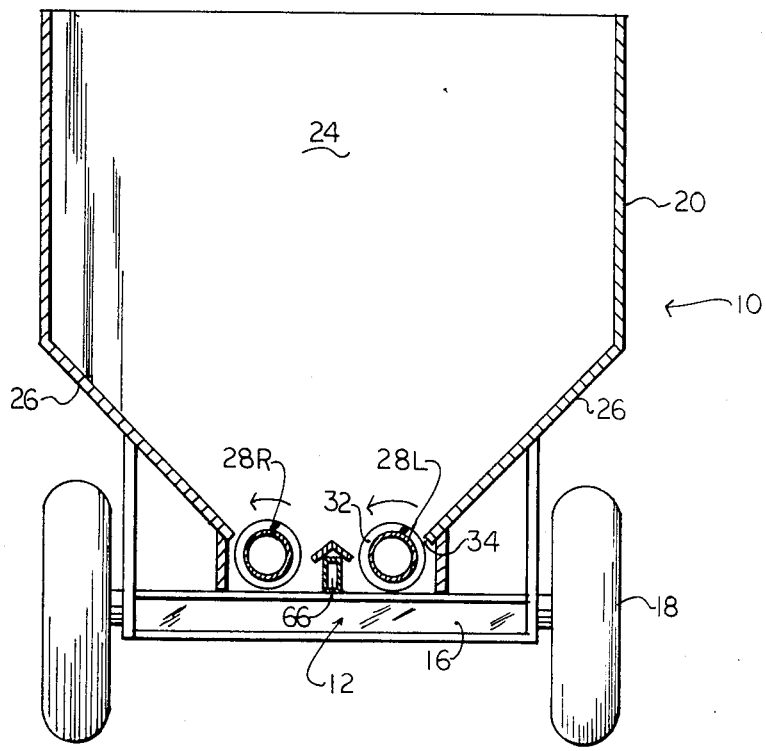
FIG. 2
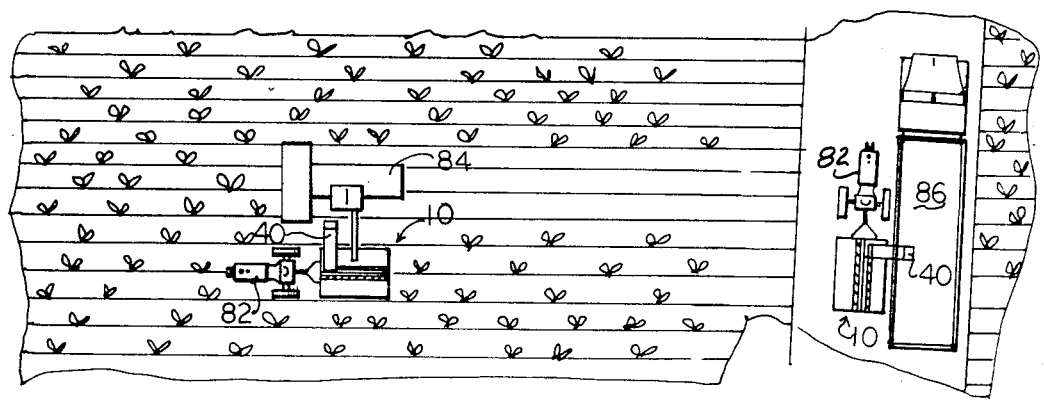
FIG. 5
INVENTOR:
HAROLD D. HARRIS
BY:
Atty.

PATENTED DEC 28 1971

INVENTOR:
HAROLD D. HARRIS
BY:
Atty.

BEET CART

CROSS-REFERENCE TO RELATED APPLICATIONS

This application is a continuation-in-part of my U.S. Pat. application for FARM CART, filed Mar. 4, 1968, Ser. No. 709,981, issued on Aug. 12, 1969, as U.S. Pat. No. 3,460,698.

BACKGROUND OF THE INVENTION

1. Field of the Invention

This invention relates to land vehicles and more particularly to a cart for transporting and unloading farm produce; stated otherwise, it is related to material handling from a self-unloading vehicle by successive power-driven conveyors.

2. Description of the Prior Art

At the present time, sugar beets are dug from the ground and loaded directly into trucks. The beets are then carried by the trucks to a refinery. The wheel spacing on the truck is not the same as row spacing and, traditionally, truck tires have high pressure and are hard. Therefore if the truck runs over a row of beets, it damages them.

SUMMARY OF THE INVENTION

I have invented a cart which is pulled by an ordinary farm tractor beside the harvester so that beets may be loaded into the cart. The cart is then moved by the tractor to a stationary truck on the turnrow and the cart emptied into the truck. The cart has a rather large capacity. The cart itself has two large low-pressure, soft tires adapted to be moved over rough terrain and cultivated fields. The tires are spaced to correspond with row spacing. Also, the bin of the cart is not mounted upon springs; therefore, the cart does not have a tendency to overturn as it is moved over ditches or rough terrain often found at the edge of the fields.

The cart has a sloping bottom, the bottom of the cart having a cleaning roll and the cart is open below the cleaning roll so that as the beets are being unloaded by an elevator at one end, any dirt on the beets is cleaned from the beets. Sugar beets are extremely tough and it is not necessary to handle them gently. Indeed, they can withstand very rough treatment, which does not harm the beets but tends to clean dirt from the beets.

An object of this invention is to transport farm produce.

Another object is to transport sugar beets from a harvester to a truck and thence to a refinery.

Further objects are to achieve the above with a device that is sturdy, compact, durable, simple, safe, versatile, lightweight, efficient and reliable, yet inexpensive and easy to manufacture, operate, and maintain.

Still further objects are to achieve the above with a method that is safe, rapid, versatile, efficient and inexpensive and does not require skilled people to adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWINGS

FIG. 2 is a sectional view of the cart, substantially on line 2—2 of FIG. 1.

FIG. 5 is a plan view of a field showing the method of operation with carts according to this invention.

DESCRIPTION OF THE PREFERRED EMBODIMENT

Figure 1:
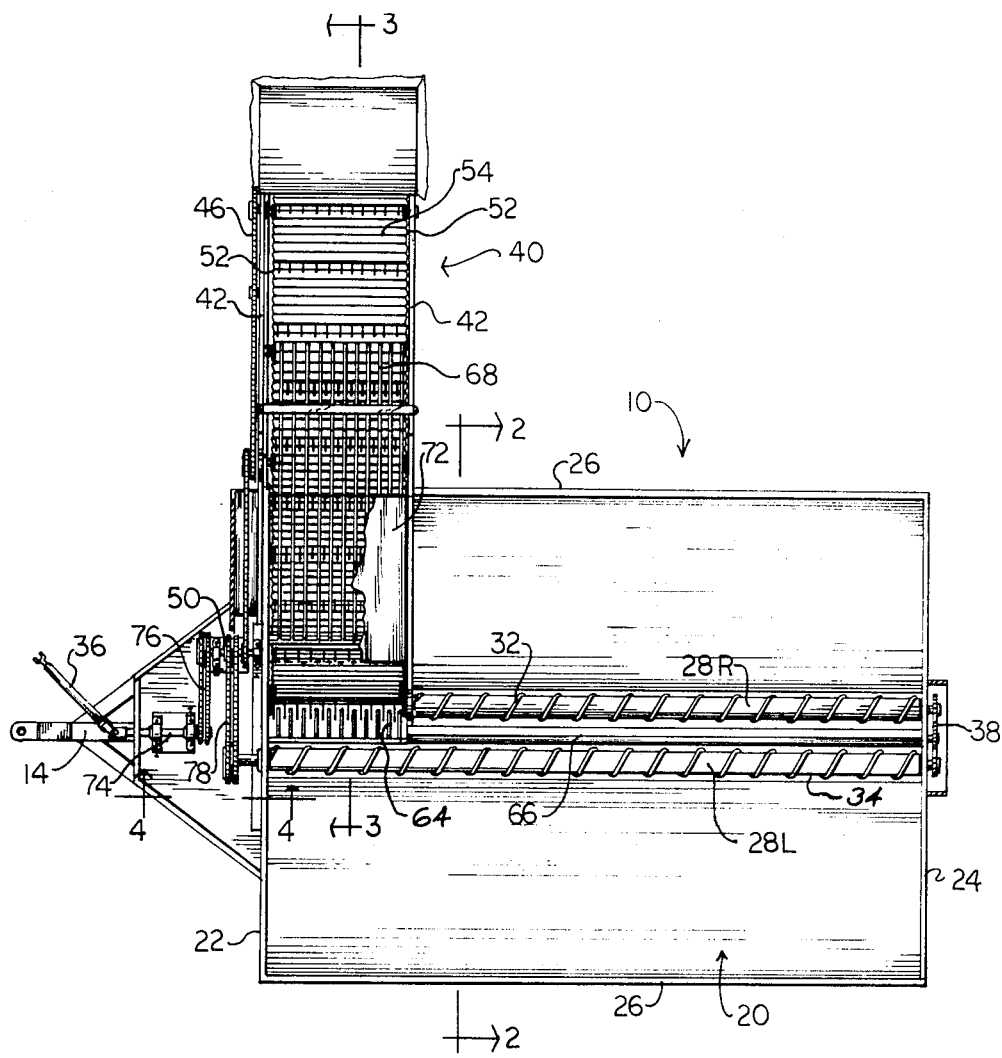
FIG. 1 is a top plan view of a cart according to this invention with the cover over the gear transmissions removed for clarity, and the cover on the elevator partially broken away for clarity.

Cart 10 is built with rigid undercarriage 12. Tongue 14 is rigidly attached to the undercarriage 12. Axle 16 is also rigidly attached to the undercarriage 12 with a wheel on each end of the axle. Large soft pneumatic tire 18 is mounted on each of the wheels. The tire carries 35 p.s.i. pressure. Bin 20 is attached directly and rigidly to the undercarriage 12. By making the connections rigid between the bin 20 to the axle 16 through the undercarriage 12 and the axle 16, there would be more likelihood of the cart overturning as it traverses rugged terrain, ditches and the like often found along the edge of cultivated fields.

The bin 20 includes front-end wall 22 and back-end wall 24 and two sides 26. The sides are vertical at the top, but at the bottom they slope inward, like a funnel, to direct the sugar beets within the bin to cleaning rolls 28L and 28R at the bottom. Bearing 30 bolted to the front-end wall 22 and a bearing (unnumbered) at the back-end wall journal the cleaning roll 28L for rotation. The cleaning roll 28R is journaled by an unnumbered bearing at the rear wall 24 and another unnumbered bearing at the rear edge of elevator arm 42. The cleaning rolls 28L and 28R are horizontal and aligned with the longitudinal axis of the cart 10 which is in alignment with the tongue 14 and normal to the axle 16. Each roll 28L and 28R is about 12 inches in diameter, and has a protuberance 32 helixed around it. The protuberances 32 are conveniently made of 1-inch diameter pipe welded to the cylindrical roll. Such rolls not only convey the sugar beets from one position to another, but also rub and clean dirt from the beets. It will be understood that when the beets are dug from the ground, they have a certain amount of soil and dirt clinging to them. It is desirable to remove the dirt in the field rather than at the refinery.

The sloping sides 26 of the cart 10 terminate even with the axes of the cleaning rolls 28L and 28R. There is a fairly wide space or gap 34 between the sides 26 and the rolls; however, it will be understood that the beets are all of sufficiently large diameter so that they will not fall through the gap 34. This gap 34 provides a place for the dirt to fall from the beets. There is no cover over the cleaning rolls 28L and 28R so that as the weight of the beets press against the cleaning rolls, their weight causes considerable cleaning action by the helic protrusions 32 on the cleaning rolls against the beets. A connection on the front of the cart 10 forms a means for connecting it to the power takeoff of farm tractor 82, which is the towing vehicle for the cart 10. This connection includes a conventional tumbler shaft or drive shaft 36 which has universal joints and a slip joint therein to accommodate the movement which will occur between the tractor 82 and the cart 10 as it traverses rough terrain. The right-hand cleaning roll 28R is driven from left-hand cleaning roll 28L by a chain 38 over a pair of sprockets at the back of the cart 10, behind the rear-end wall 24 of the cart.

Figures 3, 4:
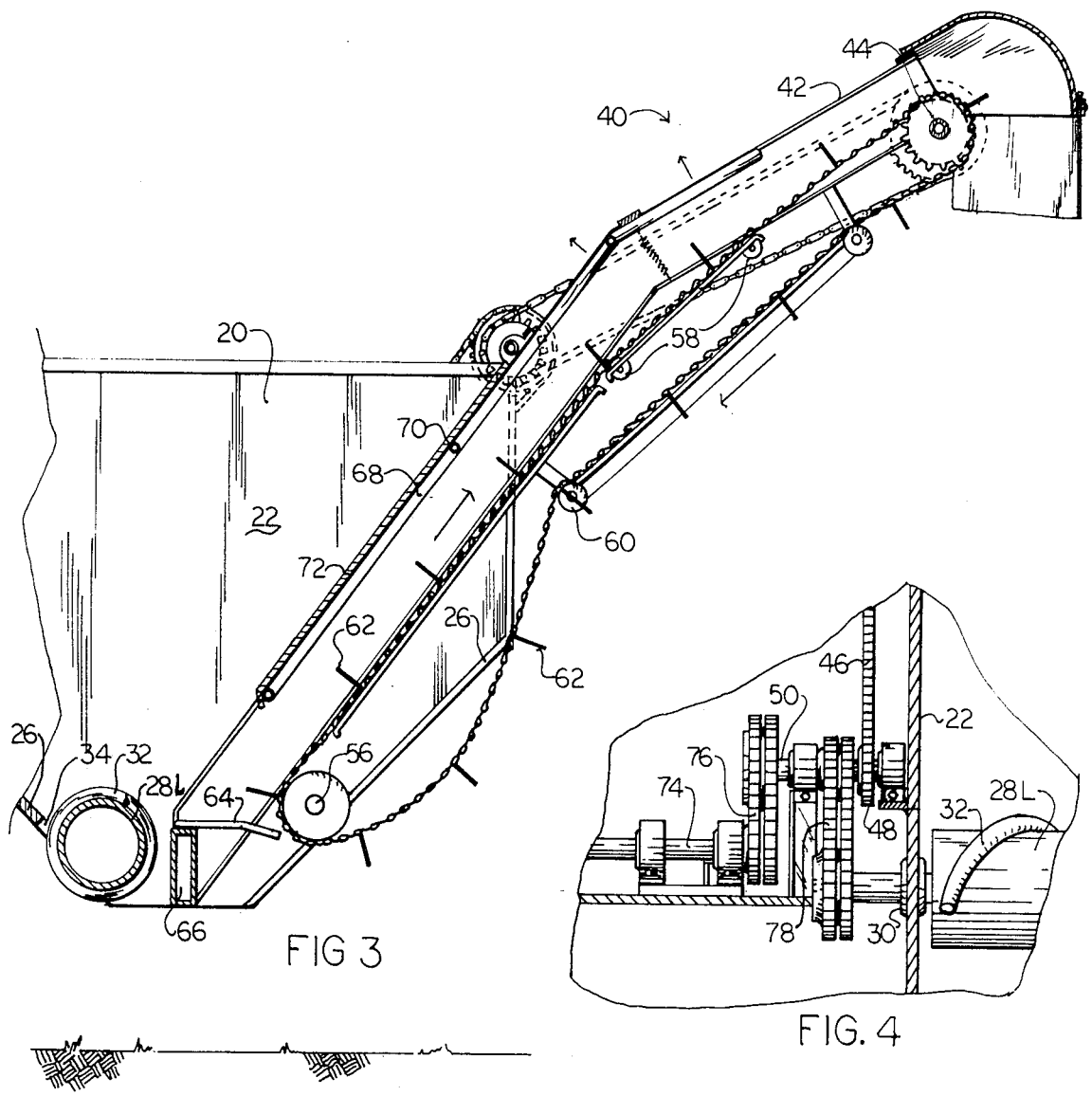
FIG. 3 is a sectional view showing only a portion of the cart and showing the elevator as would be seen taken on line 3—3 of FIG. 1.
FIG. 4 is a partial sectional view showing the drive mechanism as would be seen taken on line 4—4 of FIG. 1.

On the right side of the cart, near the front thereof, is located elevator 40. This elevator 40 includes a framework which includes two rigid arms 42 which are attached to the sidewall 26. At the top there is mounted shaft 44 between the arms 42 which is driven by chain 46 from sprocket 48 mounted upon jack shaft 50. The elevator also includes two parallel chains 52 with spaced parallel bars 54 connecting the two chains. The chains 52 are trained around sprockets on the shaft 44 at the top of the arms 42. These sprockets are located between the arms. On the lower end the chains 52 of the elevator are trained around sprockets upon idler shaft 56 which is mounted between the arms 42 of the lower end thereof. As may be seen (FIG. 3), the arms 42 are not straight, but are angled outward about halfway their height. This provides for better unloading from the elevator into truck 86. The elevator chains 52 are supported by a plurality of added idler rolls 58 on its tension run and by two slack idler rollers 60 on its return run.

The parallel crossbars 54, extending between the chains 52 of the elevator, are located about 4 inches apart and on each sixth crossbar 54, a plurality of projections 62 are attached, extending outward from the elevator chain.

The right-cleaning roll 28R, as explained before, extends from the rear wall 24 of the cart, but the front end terminates at the edge of the elevator. The beets will be carried on forward by the other cleaning roll 28L and because of the rotation of the rolls, as may be seen in FIG. 2, the beets will be thrown over onto the elevator 40. The beets are properly guided onto the elevator by guiding guard fingers 64 which are attached to reach-pole 66 of the cart. Inasmuch as the first portion of the tension run of the elevator is rather steep, it is necessary to provide rails 68 above the elevator to prevent the beets from falling or tumbling down and off the parallel bars 54. These rails 68 are conveniently attached to a grid work, including crossbars 70, which are spring biased to the arms 42. Therefore, since they are spring biased, then are free to move up slightly in case an exceedingly large beet is fed through or in the event of other obstructions, which might otherwise lock the machine down, breaking chains. Therefore, since it is necessary that the guide rail 68 be free to move upward, it would be undesirable to have beets in the cart press down upon it; therefore, a cover 72 is attached within the cart 10 to cover the elevator 40. The bottom of the elevator 40 is uncovered permitting any dirt or trash which may be freed from the beets to fall from the elevator; therefore, there is no accumulation of dirt or trash on the underside of the elevator 40.

Referring more particularly to the description of the drive, it may be seen that the tumble shaft 36 is connected to the main drive shaft 74, which is journaled by pillar bearings to the tongue. Jack shaft 50 is driven by chain 76 from the main shaft 74 and the cleaning roll 28L is driven by chain 78 from the jack shaft 50. The bearing blocks are mounted for adjustments so that the tension on the chains may be adjusted as described in my prior patent application; therefore, although these tensioning bolts may be seen in FIG. 1, they have not been described in detail herein inasmuch as they were fully described in my prior patent application identified above.

Referring to FIG. 5, it may be seen that cart 10 is towed by the tractor 82. It will be noted, although the wheels of the cart are not seen, from interpolating, the wheels of the cart follow exactly where the rear wheels of the tractor 82 run; therefore, no crop planted in the rows is crushed. Even if the wheels were to run over the crop, the tires of the cart carry about 35 pounds p.s.i. (less than 36 p.s.i.); therefore, the crops are not damaged by the wheels of the cart running over them. After harvester 84 has filled the cart 10, cart 10 is moved to the truck 86 where the beets are emptied into the truck. Another empty cart 10 may be run along side of the harvester 84. Therefore, it may be seen that there is not a one-to-one ratio between the cart and the harvester. In this case there have been illustrated two carts 10 for each harvester 84. Of course, considering the genetic aspects of the new method I have invented, in harvesting other crops, perhaps this ratio will be reversed. I.e., considering grain carts as disclosed in my prior patent application above and with the generic method to this invention as disclosed there, two harvesters are used with each grain cart. The capacity of the cart as compared to the speed of harvesting will determine the ratio. In the particular instance of using the beet cart, the cart has a capacity of about 10 or 12 tons, but the harvester can harvest approximately a ton a minute; therefore, the cart will be filled in less than a quarter of an hour in normal operations. However, in the situation with a grain cart, a substantially longer period of time is required to fill the cart.

Thus it may be seen that I have provided a farm cart which is adapted for operating with a harvester harvesting farm produce, in this case beets.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a cart for receiving farm produce from a harvester and delivering the produce to a desired location having
    a. a rigid undercarriage,
    b. a tongue rigidly attached to the undercarriage,
    c. an axle rigidly attached to the undercarriage,
    d. a wheel on each end of the axle,
    e. pneumatic tires on the wheels, and
    f. a bin on the undercarriage;
    g. the improvement comprising in combination with the above:
    h. the bin having sides which slope inward to the center thus funneling the material to the center,
    j. at least one cleaning roll extending along the bottom of the bin from front to rear,
    k. bearings at the front and rear of the bin for rotatably supporting said cleaning roll,
    m. drive means for rotating said roll whereby produce in the bin is moved to the one end of the bin,
    n. elevator means at one end of the bin for elevating the produce from the bin,
    o. drive means for powering the elevator means, and
    p. said bin open at the bottom below the cleaning roll so that material cleaned from the produce may fall from the bin.

2. The invention as defined in claim 1 with the additional limitations of
    q. two parallel cleaning rolls driven in the bottom of the bin,
    r. each cleaning roll in the form of
        i. a cylinder with
        ii. a helical projection thereon,
        iii. the projection projecting from the cylinder less than the diameter of the cylinder.

3. The invention as defined in claim 1 with the additional limitations of
    q. said tires being large, soft tires having less than 36 p.s.i. therein.

4. The invention as defined in claim 1 with the additional limitations of
    q. said elevator means including
        i. two parallel chains,
        ii. spaced parallel bars connecting said chains,
        iii. projection attached to some of said bars,
    r. said bin and elevator open below said bars, so that
    s. the produce is supported by the bars and elevated by the projections and all dirt dislodged from the product is free to fall from the elevator.

5. The invention as defined in claim 4 with the additional limitations of
    t. two parallel cleaning rolls driven in the bottom of the bin,
    u. each cleaning roll in the form of
        i. a cylinder with
        ii. a helical projection thereon,
        iii. the projection projecting from the cylinder less than the diameter of the cylinder.

6. The invention as defined in claim 5 with the additional limitations of
    v. said tires being large, soft tires having less than 36 p.s.i. therein 7. The invention as defined in claim 1 with the additional limitation of
    q. a cover attached to said bin and extending over said elevator means so that the elevator means is not blocked by the produce within the bin which has been loaded therein when the elevator was not operating.

8. The invention as defined in claim 2 with the additional limitation of s. a cover attached to said bin and extending over said elevator means so that the elevator means is not blocked by the produce within the bin which has been loaded therein when the elevator was not operating.

9. The invention as defined in claim 4 with the additional limitation of t. a cover attached to said bin and extending over said elevator means so that the elevator means is not blocked by the produce within the bin which has been loaded therein when the elevator was not operating.

10. The invention as defined in claim 6 with the additional limitation of w. a cover attached to said bin and extending over said elevator means so that the elevator means is not blocked by the produce within the bin which has been loaded therein when the elevator was not operating.

* * * * *